(12) United States Patent
Onozuka et al.

(10) Patent No.: US 11,536,206 B2
(45) Date of Patent: Dec. 27, 2022

(54) INTERNAL COMBUSTION ENGINE AND POWER GENERATION SYSTEM

(71) Applicant: MITSUBISHI HEAVY INDUSTRIES ENGINE & TURBOCHARGER, LTD., Sagamihara (JP)

(72) Inventors: Michio Onozuka, Sagamihara (JP); Daisuke Komori, Sagamihara (JP); Yosuke Kitamura, Sagamihara (JP); Sakiya Watanabe, Sagamihara (JP); Ko Takayanagi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/279,967

(22) PCT Filed: Aug. 2, 2019

(86) PCT No.: PCT/JP2019/030549
§ 371 (c)(1),
(2) Date: Mar. 25, 2021

(87) PCT Pub. No.: WO2021/024313
PCT Pub. Date: Feb. 11, 2021

(65) Prior Publication Data
US 2021/0388779 A1 Dec. 16, 2021

(51) Int. Cl.
*F02D 35/02* (2006.01)
*F02P 5/15* (2006.01)
(Continued)

(52) U.S. Cl.
CPC ............ *F02D 35/027* (2013.01); *F02B 63/04* (2013.01); *F02D 33/00* (2013.01); *F02P 5/152* (2013.01)

(58) Field of Classification Search
CPC ........ F02D 33/00; F02D 35/027; F02B 63/04; F02P 5/152; G01L 23/10; G01L 23/22; G06F 19/00
See application file for complete search history.

(56) References Cited

U.S. PATENT DOCUMENTS

| 4,945,876 A | 8/1990 | Nakaniwa |
| 7,562,558 B2 * | 7/2009 | Horner .................. F02D 35/027 73/35.09 |

(Continued)

FOREIGN PATENT DOCUMENTS

| CN | 1796753 A | 7/2006 |
| JP | 60-122271 A | 6/1985 |

(Continued)

OTHER PUBLICATIONS

International Search Report for International Application No. PCT/JP2019/030549, dated Oct. 21, 2019, with an English translation.

(Continued)

*Primary Examiner* — John Kwon
*Assistant Examiner* — Johnny H Hoang
(74) *Attorney, Agent, or Firm* — Birch, Stewart, Kolasch & Birch, LLP

(57) ABSTRACT

An internal combustion engine includes an internal combustion engine main body including a plurality of cylinders, a knock sensor provided on each of the plurality of cylinders, a control board including an amplification circuit, and a plurality of cables differing in length and each connecting the knock sensor and the control board. The amplification circuit includes, for each of the plurality of cables, a first charge amplifier connected to a first output terminal of the knock sensor via one of the plurality of cables, a second charge amplifier connected to a second output terminal of the knock sensor via one of the plurality of cables, and a differential amplifier configured to take an output of the first (Continued)

charge amplifier and an output of the second charge amplifier as input.

5 Claims, 5 Drawing Sheets

(51) Int. Cl.
  *F02B 63/04* (2006.01)
  *F02D 33/00* (2006.01)
  *F02P 5/152* (2006.01)

(56) References Cited

U.S. PATENT DOCUMENTS

| | | | |
|---|---|---|---|
| 8,150,602 B2* | 4/2012 | Anilkumar | G01L 23/225 701/110 |
| 2006/0011169 A1 | 1/2006 | Hagari | |
| 2006/0086177 A1 | 4/2006 | Okubo et al. | |
| 2006/0243030 A1* | 11/2006 | Oe | G01L 23/225 73/35.09 |
| 2007/0175268 A1* | 8/2007 | Honda | G01L 23/225 73/35.04 |
| 2007/0179756 A1* | 8/2007 | Honda | G01L 23/225 702/190 |
| 2009/0007893 A1 | 1/2009 | Kato et al. | |
| 2009/0064762 A1* | 3/2009 | Horner | F02D 41/222 73/35.05 |
| 2009/0118989 A1 | 5/2009 | Padhi et al. | |
| 2009/0120164 A1 | 5/2009 | Anilkumar et al. | |
| 2010/0043531 A1* | 2/2010 | Garrard | G01L 27/007 73/35.07 |
| 2010/0079155 A1* | 4/2010 | Matsuoka | G01L 9/065 374/185 |
| 2013/0151116 A1 | 6/2013 | Kusumoto et al. | |
| 2014/0225634 A1 | 8/2014 | Broillet | |
| 2014/0298908 A1 | 10/2014 | Ichikawa | |
| 2015/0315993 A1* | 11/2015 | Nagai | F02D 35/023 701/102 |
| 2015/0323406 A1 | 11/2015 | Mirassou | |

FOREIGN PATENT DOCUMENTS

| | | | |
|---|---|---|---|
| JP | 63-193027 | A | 8/1988 |
| JP | 1-203643 | A | 8/1989 |
| JP | 02-130210 | A | 5/1990 |
| JP | 2-203237 | A | 8/1990 |
| JP | 06-173699 | A | 6/1994 |
| JP | 7-103857 | A | 4/1995 |
| JP | 08-028385 | A | 1/1996 |
| JP | 11-258017 | A | 9/1999 |
| JP | 2000-131105 | A | 5/2000 |
| JP | 2002-256960 | A | 9/2002 |
| JP | 3478375 | B2 | 12/2003 |
| JP | 2005-195337 | A | 7/2005 |
| JP | 2007-093233 | A | 4/2007 |
| JP | 2007-198177 | A | 8/2007 |
| JP | 2009-30593 | A | 2/2009 |
| JP | 2010-180836 | A | 8/2010 |
| JP | 2011-503542 | A | 1/2011 |
| JP | 2014-157154 | A | 8/2014 |
| JP | 2014-202616 | A | 10/2014 |
| JP | 2016-89719 | A | 5/2016 |
| JP | 2016-196850 | A | 11/2016 |

OTHER PUBLICATIONS

Written Opinion of the International Searching Authority for International Application No. PCT/JP2019/030549, dated Oct. 21, 2019, with an English translation.

Office Action issued in Japanese Application No. 2018-092588 dated Sep. 27, 2022 with a Machine Translation.

Yasushi Murano, "Structure" and "Fundamentals" of Operational Amplifier Circuit, Gijutsu-Hyoron Col, Ltd., Dec. 10, 2012, p. 178.

* cited by examiner

INTERNAL COMBUSTION ENGINE AND POWER GENERATION SYSTEM

TECHNICAL FIELD

The present invention relates to an internal combustion engine and a power generation system.

BACKGROUND ART

Sensors are used in various systems. In order for a sensor to correctly detect a target physical quantity, it is necessary to reduce influence from the measuring environment such as wiring and noise.

Patent Document 1 describes, as an associated technique, a technique related to a vortex flow meter that takes the difference between the outputs of two charge amplification circuits and cancels common mode noise applied to one piezoelectric element.

CITATION LIST

Patent Literature

Patent Document 1: JP 3478375 B

SUMMARY OF INVENTION

Technical Problem

Incidentally, internal combustion engines used as a power source for generators in power generation systems that generate power are often provided with a plurality of cylinders (i.e., multi-cylinder). In internal combustion engines, ignition timing is controlled to control combustion. However, a phenomenon called knocking sometimes occurs when, for example, air inside the cylinder is compressed more strongly than normal, which then causes the intake air to reach a high temperature and triggers spontaneous combustion, with combustion occurring at a timing different from the ignition timing. If knocking occurs, the cylinder vibrates. Thus, in some internal combustion engines, a sensor that detects vibration of the cylinder, called knock sensor, is provided on each cylinder to detect knocking.

Since the output signal of a knock sensor is a differential output, it is susceptible to common mode noise. In addition, in a case where the output signal of a knock sensor is simply converted to a voltage, if the wiring length for transmitting the voltage is long, it is susceptible to voltage variation due to wiring length. In addition, in a case where the wiring lengths for transmitting voltages are non-uniform among knock sensors, even if the cylinders vibrate approximately equally, each knock sensor may detect a different vibration due to influence from these non-uniform wiring lengths.

Therefore, in a case where knocking is to be detected in internal combustion engines, there is a demand for a technique capable of correctly detecting vibration, which is a physical quantity to be detected, that is, the output signals of the knock sensors.

An object of the present invention is to provide an internal combustion engine and a power generation system that can solve the above problems.

Solution to Problem

According to a first aspect of the present invention, an internal combustion engine includes an internal combustion engine main body including a plurality of cylinders, a knock sensor provided on each of the plurality of cylinders, a control board including an amplification circuit, and a plurality of cables differing in length and each connecting the knock sensor and the control board. The amplification circuit includes, for each of the plurality of cables, a first charge amplifier connected to a first output terminal of the knock sensor via one of the plurality of cables, a second charge amplifier connected to a second output terminal of the knock sensor via one of the plurality of cables, and a differential amplifier configured to take an output of the first charge amplifier and an output of the second charge amplifier as input.

According to a second aspect of the present invention, in the internal combustion engine of the first aspect, the amplification circuit may further include a bandpass filter configured to allow a frequency band of an output of the differential amplifier to pass through.

According to a third aspect of the present invention, in the internal combustion engine of the first or second aspect, the control board may include a determination unit configured to determine whether knocking has occurred on the basis of an output signal of the amplification circuit.

According to a fourth aspect of the present invention, in the internal combustion engine of the third aspect, the determination unit may be configured to determine, if it is determined that an amplitude of the output signal of the amplification circuit is not greater than a threshold value of amplitude for determining that knocking has occurred, that no knocking has occurred, and the determination unit may be configured to determine, if it is determined that the amplitude of the output signal of the amplification circuit exceeds the threshold value, that knocking is occurring.

According to a fifth aspect of the present invention, in the internal combustion engine of any one of the first to fourth aspects, the control board may include a correction unit configured to correct, if it is determined that knocking is occurring, an ignition timing of fuel in the internal combustion engine main body or an amount of fuel supplied to the internal combustion engine main body.

According to a sixth aspect of the present invention, a power generation system includes the internal combustion engine according to any one of the first to third aspects, and a generator configured to generate power, with energy generated by the internal combustion engine serving as a power source.

Advantageous Effects of Invention

According to an internal combustion engine and a power generation system according to the embodiments of the present invention, it is possible to correctly detect the vibration to be detected by the knock sensor.

DESCRIPTION OF EMBODIMENTS

Embodiments

Embodiments will be described in detail hereinafter with reference to the appended drawings.

Hereinafter, a power generation system according to an embodiment of the present invention will be described.

Figure 1:
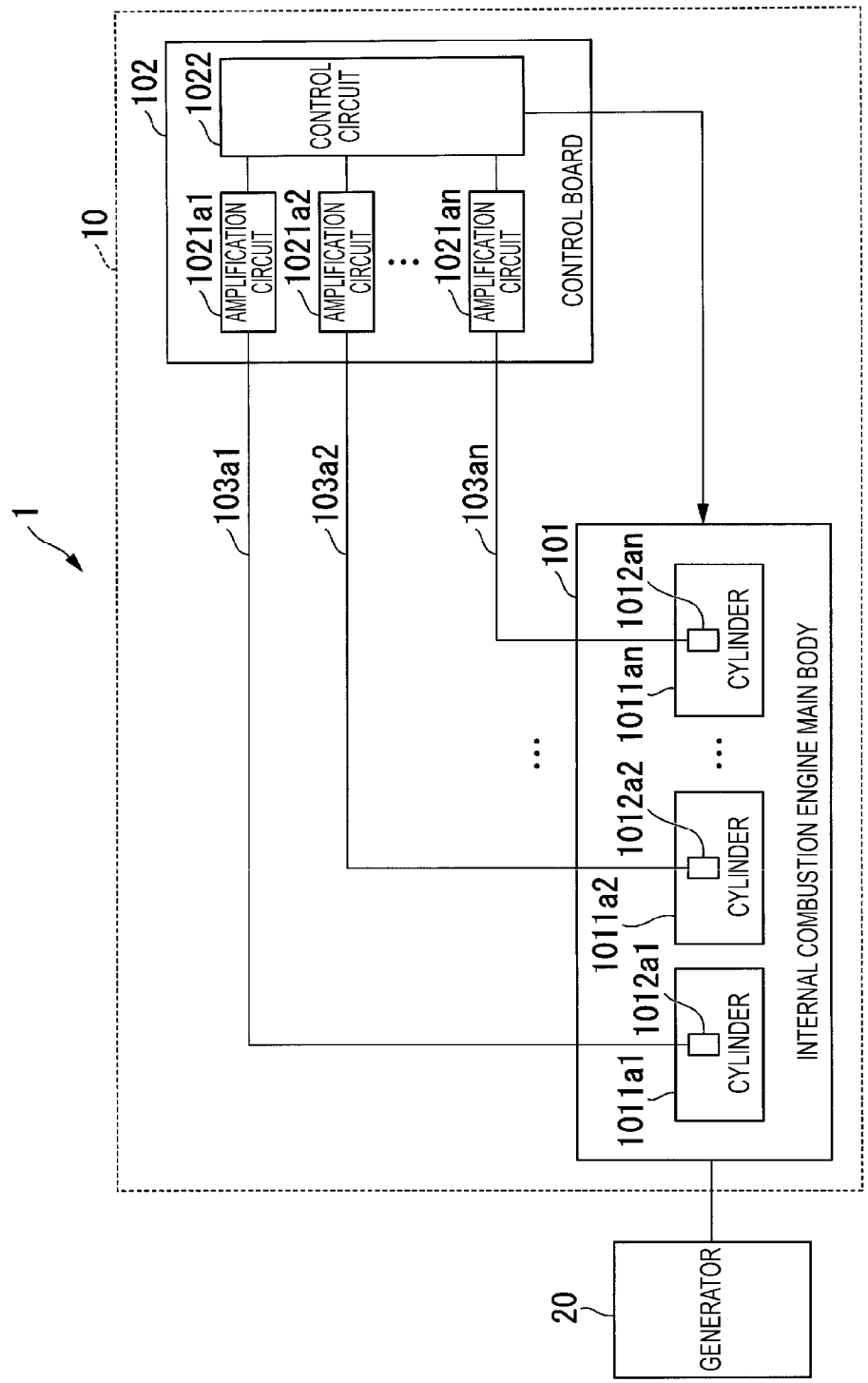
FIG. 1 is a diagram illustrating the configuration of a power generation system according to an embodiment of the present invention.

FIG. 1 is a diagram illustrating the configuration of a power generation system 1 according to an embodiment of the present invention. As illustrated in FIG. 1, the power generation system 1 includes an internal combustion engine 10 and a generator 20. The power generation system 1 is a system that generates power by rotating the generator 20, with energy obtained by combustion in an internal combustion engine 10 serving as a power source.

The internal combustion engine 10 includes an internal combustion engine main body 101, a control board 102, and cables 103a1, 103a2, . . . , and 103an. The cables 103a1, 103a2, . . . , and 103an are collectively referred to as cable 103 or cables 103.

The internal combustion engine main body 101 includes cylinders (cylinders) 1011a1, 1011a2, . . . , and 1011an, and knock sensors 1012a1, 1012a2, . . . , and 1012an. The cylinders 1011a1, 1011a2, . . . , and 1011an are collectively referred to as cylinder 1011 or cylinders 1011. The knock sensors 1012a1, 1012a2, . . . , and 1012an are collectively referred to as knock sensor 1012 or knock sensors 1012.

In the internal combustion engine main body 101, gas is combusted in each cylinder 1011 to move the piston (not illustrated) up and down within each cylinder 1011 and rotate the crank shaft (not illustrated), for example, thereby obtaining rotational energy.

The knock sensor 1012 is a sensor configured to detect knocking in the cylinder 1011. Knocking is the occurrence of abnormal vibration in the cylinder 1011. The following describes conceivable causes of knocking. If air inside the cylinder 1011 is compressed more strongly than normal by the gas fuel, then the intake air reaches a high temperature, spontaneous combustion is triggered, and this spontaneous combustion causes the gas to start combustion earlier than the proper ignition timing of the engine.

The knock sensor 1012 is provided on each cylinder 1011 to detect vibration in the cylinder 1011. Specifically, the knock sensor 1012a1 is provided on the cylinder 1011a1 to detect vibration in the cylinder 1011a. The knock sensor 1012a2 is also provided on the cylinder 1011a2 to detect vibration in the cylinder 1011a2. The knock sensor 1012an is also provided on the cylinder 1011an to detect vibration in the cylinder 1011an. The knock sensor 1012 has a first output terminal and a second output. An electrical signal having a charge amount corresponding to a magnitude of the detected vibration is outputted from the first output terminal and the second output terminal. Note that when vibration is not detected, the charge amount outputted from the first output terminal and the charge amount outputted from the second output terminal are equal charge amounts falling within an error range. In addition, in a case where vibration is detected, compared to, as a reference, the charge amount outputted when no vibration is detected, the charge amount outputted from the second output terminal is small if the charge amount outputted from the first output terminal is large, and the charge amount outputted from the second output terminal is large if the charge amount outputted from the first output terminal is small. That is, the charge amount outputted from the first output terminal and the charge amount outputted from the second output terminal are inversely increased or decreased with respect to each other, with the charge amount outputted when no vibration is detected serving as a reference.

The control board 102 is a control board configured to amplify the electrical signal outputted from the knock sensor 1012 and control the operation of the internal combustion engine main body 101 on the basis of the amplified signal. The control board 102 includes amplification circuits 1021a1, 1021a2, . . . , and 1021an, and a control circuit 1022 (an example of a determination unit and an example of a correction unit). The amplification circuits 1021a1, 1021a2, . . . , and 1021an are collectively referred to as amplification circuit 1021 or amplification circuits 1021.

Figure 2:
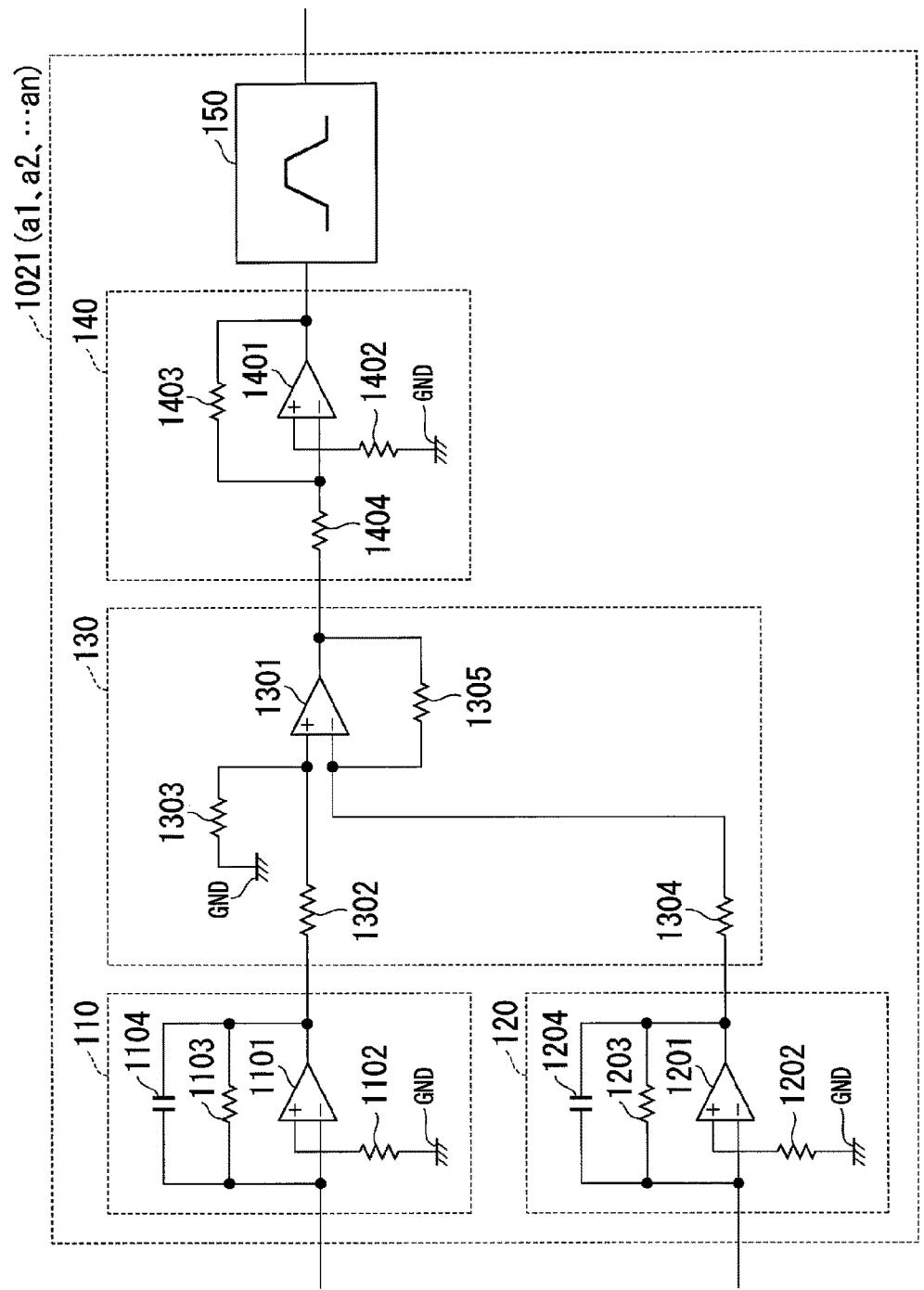
FIG. 2 is a diagram illustrating the configuration of an amplification circuit according to an embodiment of the present invention.

As illustrated in FIG. 2, each amplification circuit 1021 includes a first charge amplifier 110, a second charge amplifier 120, a differential amplifier 130, a gain amplifier 140, and a bandpass filter 150.

As illustrated in FIG. 2, the first charge amplifier 110 includes an operational amplifier 1101, resistors 1102 and 1103, and a capacitor 1104. A first terminal of the resistor 1102 is connected to a non-inverting input terminal of the operational amplifier 1101. A first output terminal of the knock sensor 1012, a first terminal of the resistor 1103, and a first terminal of the capacitor 1104 are connected to an inverting input terminal of the operational amplifier 1101. A second terminal of the resistor 1103 and a second terminal of the capacitor 1104 are connected to an output terminal of the operational amplifier 1101. A second terminal of the resistor 1102 is connected to the ground GND.

The first charge amplifier 110 is a circuit configured to output a signal proportional to the total charge amount inputted (the integrated value of the current). The first charge amplifier 110 receives the electrical signal outputted from the first output terminal of the knock sensor 1012 at the inverting input terminal via the cable 103. The first charge amplifier 110 converts the received electrical signal into a signal proportional to the total charge amount by an integration circuit consisting of the resistor 1103 and the capacitor 1104. At this time, the first charge amplifier 110 can convert the received electrical signal into a signal proportional to the total charge amount without depending on the length of the cable 103. The first charge amplifier 110 outputs the converted signal to the differential amplifier 130.

As illustrated in FIG. 2, the second charge amplifier 120 includes an operational amplifier 1201, resistors 1202 and 1203, and a capacitor 1204. A first terminal of the resistor 1202 is connected to a non-inverting input terminal of the operational amplifier 1201. A second output terminal of the knock sensor 1012, a first terminal of the resistor 1203, and a first terminal of the capacitor 1204 are connected to an inverting input terminal of the operational amplifier 1201. A second terminal of the resistor 1203 and a second terminal of the capacitor 1204 are connected to an output terminal of the operational amplifier 1201. A second terminal of the resistor 1202 is connected to the ground GND.

Similar to the first charge amplifier 110, the second charge amplifier 120 is a circuit configured to output a signal proportional to the total charge amount inputted (the integrated value of the current). The second charge amplifier 120 receives an electrical signal outputted from the second output terminal of the knock sensor 1012 at the inverting input terminal via the cable 103. The second charge amplifier 120 converts the received electrical signal into a signal proportional to the total charge amount by an integration circuit consisting of the resistor 1203 and the capacitor 1204. At this time, the second charge amplifier 120 converts the received electrical signal into a signal proportional to the total charge amount without depending on the length of the cable 103. The second charge amplifier 120 outputs the converted signal to the differential amplifier 130.

Note that the circuit constant of the second charge amplifier 120 is made approximately equal to the circuit constant of the first charge amplifier 110. In addition, the circuit constant of the second charge amplifier 120 and the circuit constant of the first charge amplifier 110 are fixed values.

As illustrated in FIG. 2, the differential amplifier 130 includes an operational amplifier 1301 and resistors 1302, 1303, 1304, and 1305. A first terminal of the resistor 1302 and a first terminal of the resistor 1303 are connected to a non-inverting input terminal of the operational amplifier 1301. A first terminal of the resistor 1304 and a first terminal of the resistor 1305 are connected to an inverting input terminal of the operational amplifier 1301. A second terminal of the resistor 1305 is connected to an output terminal of the operational amplifier 1301. A second terminal of the resistor 1302 is connected to the output terminal of the first charge amplifier 110. A second terminal of the resistor 1303 is connected to the ground GND. A second terminal of the resistor 1304 is connected to the output terminal of the second charge amplifier 120.

With the output of the first charge amplifier 110 and the output of the second charge amplifier 120 serving as a differential input signal, the differential amplifier 130 amplifies the differential input signal and outputs the amplified signal to the gain amplifier 140. The differential amplifier 130 amplifies the differential input signal. This differential amplifier 130 improves a common-mode rejection ratio (CMRR).

Note that the resistance value of the resistor 1302 is made approximately equal to the resistance value of the resistor 1304. Also, the resistance value of the resistor 1303 is made approximately equal to the resistance value of the resistor 1305. Additionally, the resistance value of each of the resistors 1302, 1303, 1304, and 1305 is a fixed value.

As illustrated in FIG. 2, the gain amplifier 140 includes an operational amplifier 1401 and resistors 1402, 1403, and 1404. A first terminal of the resistor 1402 is connected to a non-inverting input terminal of the operational amplifier 1401. A first terminal of the resistor 1403 and a first terminal of the resistor 1404 are connected to an inverting input terminal of the operational amplifier 1401. A second terminal of the resistor 1403 is connected to an output terminal of the operational amplifier 1401. A second terminal of the resistor 1402 is connected to the ground GND. A second terminal of the resistor 1404 is connected to an output terminal of the differential amplifier 130.

The gain amplifier 140 amplifies the output signal of the amplification circuit 1021 such that the amplitude of the output signal of the amplification circuit 1021 comes to the desired amplitude corresponding to the magnitude of the electrical signal outputted by the knock sensor 1012. The gain amplifier 140 outputs the amplified signal to the bandpass filter 150.

The bandpass filter 150 allows only signals of a predetermined frequency component to pass through. A predetermined frequency component means a signal component indicating a frequency that is contained in an electrical signal outputted by the knock sensor 1012. The bandpass filter 150 receives an output signal outputted from the gain amplifier 140, out of the received signals, allows only a signal having a frequency component that needs to pass through the bandpass filter 15 to pass through, and outputs the signal that has passed through to the control circuit 1022.

The control circuit 1022 receives a signal of a predetermined frequency component from each amplification circuit 1021. The control circuit 1022 compares the amplitude of the signal received from each amplification circuit 1021 with a threshold value. This threshold value is an amplitude value determined by the amplitude of the electrical signal outputted from the knock sensor 1012 when knocking has occurred, that is, when the cylinder 1011 vibrates, and is an amplitude value for determining whether knocking has occurred. When the amplitude of the signal received from the amplification circuit 1021 is not greater than the threshold value, the control circuit 1022 determines that no knocking is occurring in the internal combustion engine main body 101. In addition, when the amplitude of the signal received from the amplification circuit 1021 exceeds the threshold value, the control circuit 1022 determines that knocking has occurred in the cylinder 1011 corresponding to the signal. If it is determined that knocking has occurred in the cylinder 1011, the control circuit 1022 prevents the occurrence of knocking by performing control to correct the ignition timing of the gas, or performing control to correct the amount of gas fuel supplied to the internal combustion engine main body 101.

The generator 20 generates power by rotating, with energy generated by the internal combustion engine 10 serving as a power source.

Next, the processing of the power generation system 1 according to an embodiment of the present invention will be described.

Figure 3:
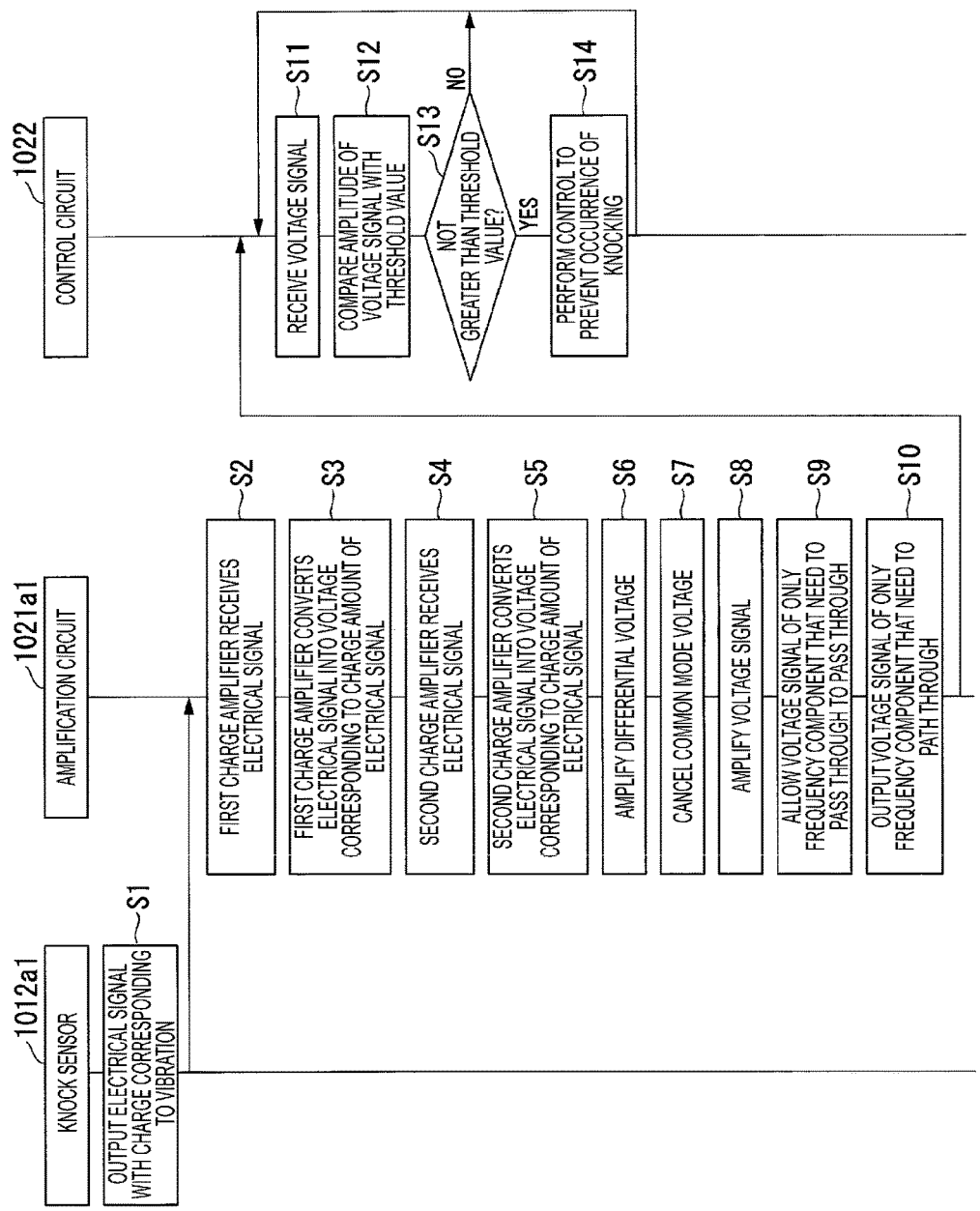
FIG. 3 is a diagram illustrating the processing flow of a power generation system according to an embodiment of the present invention.

Here, the processing flow of the power generation system 1 illustrated in FIG. 3 will be described.

Note that while the processing of the power generation system 1 is described in the following by using a case in which the output signal of the knock sensor 1012a1 provided on the cylinder 1011a1 is detected as an example, the processing for the knock sensor 1012 provided on each cylinder 1011 is also performed in the same manner as that for the knock sensor 1012a1 provided on the cylinder 1011a1.

The knock sensor 1012a1 detects vibration of the cylinder 1011a1 and outputs an electrical signal with a charge amount corresponding to the vibration to the amplification circuit 1021a1 (step S1). For example, if no knocking is occurring in the cylinder 1011a1, the knock sensor 1012a1 outputs electrical signals with an approximately equal charge amount from the first output terminal and the second output terminal. In addition, when knocking has occurred in the cylinder 1011a1, the knock sensor 1012a1 outputs electrical signals from the first output terminal and the second output terminal that are inversely increased or decreased with respect to each other, with the charge amount outputted from the first output terminal and the charge amount outputted from the second output terminal when no knocking is occurring serving as a reference. Specifically, when knocking has occurred, the knock sensor 1012a1 outputs from the first output terminal an electrical signal with great charge compared to when no knocking is occurring, and outputs from the second output terminal an electrical signal with less charge compared to when no knocking is occurring. Alternatively, when knocking has occurred, the knock sensor 1012*a*1 outputs from the first output terminal an electrical signal with less charge compared to when no knocking is occurring, and outputs from the second output terminal an electrical signal with great charge compared to when no knocking is occurring.

The first charge amplifier 110 receives an electrical signal from the knock sensor 1012*a*1 (step S2). The first charge amplifier 110 stores the charge of the received electrical signal in the capacitor 1104, thereby converting it into a voltage having a magnitude corresponding to the charge amount of the electrical signal (step S3). The first charge amplifier 110 outputs a voltage having a magnitude corresponding to the charge amount of the electrical signal to the differential amplifier 130. Note that in a case where an electrical signal with great charge compared to the charge of when no knocking is occurring is received, for example, the first charge amplifier 110 outputs a low voltage compared to the voltage outputted when no knocking is occurring. In addition, in a case where an electrical signal with less charge compared to the charge of when no knocking is occurring is received, for example, the first charge amplifier 110 outputs a high voltage compared to the voltage outputted when no knocking is occurring.

The second charge amplifier 120 also receives an electrical signal from the knock sensor 1012*a*1 (step S4). The second charge amplifier 120 stores the charge of the received electrical signal in the capacitor 1204, thereby converting it into a voltage having a magnitude corresponding to the charge amount of the electrical signal (step S5). The second charge amplifier 120 outputs a voltage having a magnitude corresponding to the charge amount of the electrical signal to the differential amplifier 130. Note that in a case where an electrical signal with less charge compared to the charge of when no knocking is occurring is received, for example, the second charge amplifier 120 outputs a high voltage compared to the voltage outputted when no knocking is occurring. In addition, in a case where an electrical signal with great charge compared to the charge of when no knocking is occurring is received, for example, the second charge amplifier 120 outputs a low voltage compared to the voltage outputted when no knocking is occurring.

Note that when the electrical signals inputted to the differential input terminals of the amplification circuit 1021*a*1 are approximately equal, the output signal outputted by the first charge amplifier 110 and the output signal outputted by the second charge amplifier 120 are approximately equal.

Note that, as described above, the first charge amplifier 110 and the second charge amplifier 120 convert the charge amount of an electrical signal outputted by the knock sensor 1012*a*1 into a voltage. Thus, regardless of the length of the cable 103*a*1 connecting the knock sensor 1012*a*1 and the amplification circuit 1021*a*1, the first charge amplifier 110 and the second charge amplifier 120 can output a voltage corresponding to the charge of the electrical signal outputted by the knock sensor 1012*a*1.

The differential amplifier 130 receives signals with different voltages from the first charge amplifier 110 and the second charge amplifier 120. The differential amplifier 130 amplifies the differential voltage between the voltage received from the first charge amplifier 110 and the voltage received from the second charge amplifier 120 (step S6). Furthermore, at this time, the differential amplifier 130 cancels the common mode voltage (voltage of the in-phase component) contained in the voltage received from the first charge amplifier 110 and the voltage received from the second charge amplifier 120 (step S7). The differential amplifier 130 outputs the amplified voltage to the gain amplifier 140. Note that when the output signal of the first charge amplifier 110 and the output signal of the second charge amplifier 120 are approximately equal, that is, when the signals inputted to the differential input terminals of the differential amplifier 130 are approximately equal, then the differential amplifier 130 outputs a signal approximately equal to the output signal of when no knocking is occurring, which is determined by the bias. In addition, when the voltage received from the first charge amplifier 110 is greater than the voltage received from the second charge amplifier 120, the differential amplifier 130 outputs a signal of a greater voltage than the voltage outputted when no knocking is occurring. In addition, when the voltage received from the first charge amplifier 110 is less than the voltage received from the second charge amplifier 120, the differential amplifier 130 outputs a voltage signal of a less voltage than the voltage outputted when no knocking is occurring.

The gain amplifier 140 receives a voltage signal from the differential amplifier 130. The gain amplifier 140 amplifies the received voltage signal (step S8). The gain amplifier 140 outputs the amplified voltage signal to the bandpass filter 150.

The bandpass filter 150 receives a voltage signal from the gain amplifier 140. Out of the received voltage signals, the bandpass filter 150 allows a voltage signal having only a predetermined frequency component that needs to pass through to pass through (step S9) and outputs the voltage signal having only the frequency component to the control circuit 1022 (step S10).

Note that when the output of the differential amplifier 130 is a signal approximately equal to the output signal of when no knocking is occurring, which is determined by the bias, then the output signal of the amplification circuit 1021*a*1 outputted via the gain amplifier 140 and the bandpass filter 150 is a signal approximately equal to the output signal of the amplification circuit 1021*a*1 of when no knocking is occurring, which is determined by the bias. That is, when no knocking is occurring in the cylinder 1011*a*1, the output signal of the amplification circuit 1021*a*1 is a signal approximately equal to the output signal of the amplification circuit 1021*a*1 of when no knocking is occurring, which is determined by the bias.

The control circuit 1022 receives a voltage signal having a predetermined frequency component from the amplification circuit 1021*a*1 (step S11). The control circuit 1022 compares the amplitude of the received voltage signal with a threshold value (step S12). This threshold value is an amplitude value determined by the amplitude of the electrical signal outputted by the knock sensor 1012 when knocking has occurred, that is, when the cylinder 1011 vibrates, and is an amplitude value for determining whether knocking has occurred. The control circuit 1022 determines whether the amplitude of a signal received from the amplification circuit 1021 is not greater than the threshold value (step S13).

If it is determined that the amplitude of the signal received from the amplification circuit 1021 is not greater than the threshold value (NO in step S13), the control circuit 1022 determines that no knocking is occurring in the internal combustion engine main body 101, and the processing in the control circuit 1022 returns to the processing of step S11.

In addition, if it is determined that the amplitude of the signal received from the amplification circuit 1021 exceeds the threshold value (YES in step S13), the control circuit 1022 determines that knocking has occurred in the cylinder 1011 corresponding to the signal. If it is determined that knocking has occurred in the cylinder 1011, the control circuit 1022 performs control to prevent the occurrence of knocking by controlling the ignition timing of the gas, or by controlling the amount of gas fuel supplied to the internal combustion engine main body 101 and the like (step S14). Then, the processing in the control circuit 1022 returns to the processing of step S11.

The power generation system 1 according to an embodiment of the present invention has been described above.

In the power generation system 1 according to an embodiment of the present invention, the internal combustion engine 10 includes the internal combustion engine main body 101 including the plurality of cylinders 1011 (cylinders); the control board 102 configured to control the operation of the internal combustion engine main body 101; the knock sensor 1012 provided on each of the plurality of cylinders 1011; and the plurality of cables 103 differing in length and each connecting the knock sensor 1012 and the control board 102. The control board 102 includes, for each of the plurality of cables 103, the first charge amplifier 110 connected to the first output terminal of the knock sensor 1012 via one of the plurality of cables 103; the second charge amplifier 120 connected to the second output terminal of the knock sensors 1012 via one of the plurality of cables 103; and the differential amplifier 130 configured to take an output of the first charge amplifier 110 and an output of the second charge amplifier 120 as input.

Figure 4:
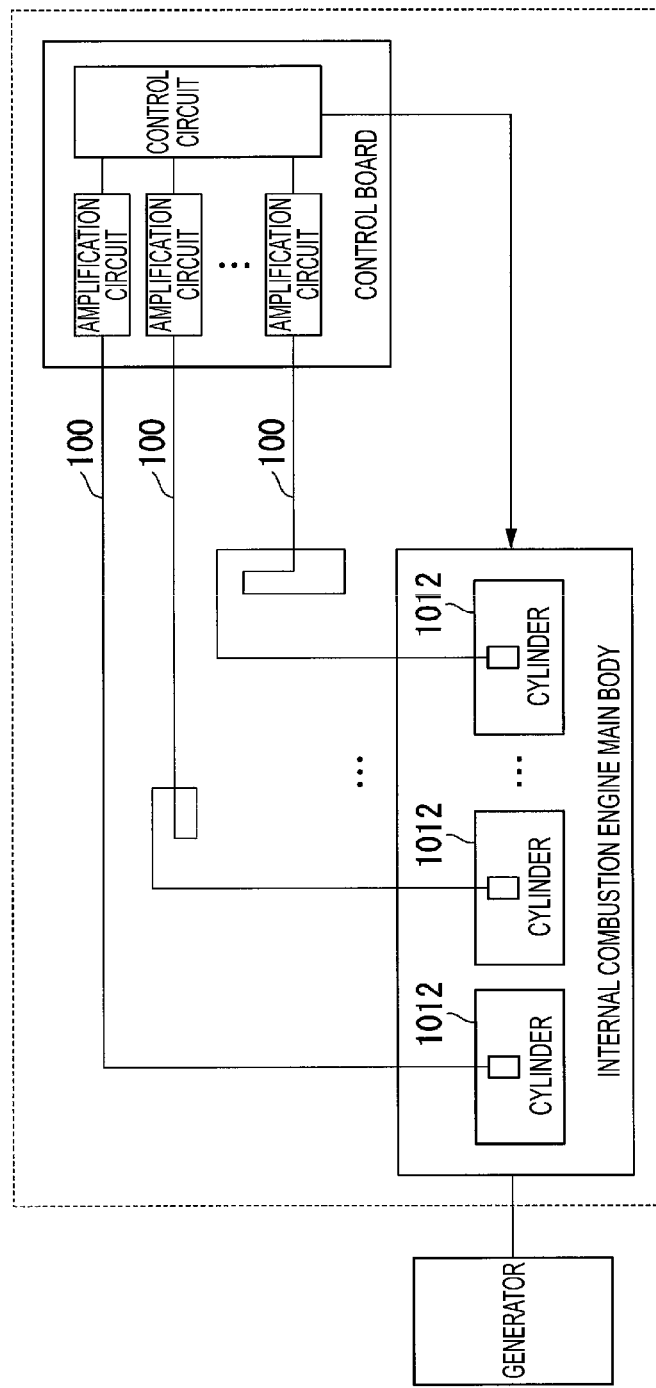
FIG. 4 is a diagram illustrating the configuration of a power generation system that serves as a comparison target for a power generation system according to an embodiment of the present invention.

Incidentally, the output signal of the knock sensor is susceptible to influence from the measuring environment such as noise and wiring. Thus, in the case of a power generation system in which the output of the knock sensor 1012 is affected by the capacitance of the cable 100, which serves as a comparison target for the power generation system 1 according to an embodiment of the present invention, the lengths of the cables 100, which are the wires from the knock sensors 1012 provided on each cylinder 1011 to the amplification circuits configured to amplify the output signals of the knock sensors 1012, need to be made approximately equal as illustrated in FIG. 4.

On the other hand, the first charge amplifier 110 and the second charge amplifier 120 in the power generation system 1 according to an embodiment of the present invention convert a charge amount of an electrical signal outputted by the knock sensor 1012$a$1, after the charge has moved via the cable 103, to a voltage. Thus, regardless of the length of the cable 103$a$1 connecting the knock sensor 1012$a$1 and the amplification circuit 1021$a$1, the first charge amplifier 110 and the second charge amplifier 120 can output a voltage corresponding to the charge amount of the electrical signal outputted by the knock sensor 1012$a$1. Furthermore, the differential amplifier 130 cancels the common mode voltage (voltage of the in-phase component) contained in the voltage received from the first charge amplifier 110 and the voltage received from the second charge amplifier 120. Accordingly, when knocking in the internal combustion engine 10 is detected, the internal combustion engine 10 can reduce noise from the cables 103 (wires), which are greatly affected by the measuring environment, and the in-phase component. Also, when each knock sensor 1012 detects an approximately equal vibration, the internal combustion engine 10 can detect them as approximately equal output signals (i.e., it is possible to reduce variation in detection among the respective knock sensors 1012). Note that, in the comparative power generation system, it is necessary to normalize the length of the cables 100 to six meters, which is the longest length among the cables. In contrast, in the power generation system 1 according to an embodiment of the present invention illustrated in FIG. 1, it has been experimentally confirmed that it is possible to detect the outputs of the knock sensors 1012 even when the cables 103$a$1 to 103$an$ that are non-uniform in length and from three to six meters are used.

Thus, the internal combustion engine 10 according to an embodiment of the present invention can correctly detect the vibration to be detected by the knock sensors 1012, that is, the output signals of the knock sensors 1012, both in a case where the lengths of the cables 103 are non-uniform and in a case where the lengths of the cables 103 are approximately equal.

Note that in a case where the lengths of the cables 103 are restricted to necessary lengths in the power generation system 1, there is no need to normalize the lengths to the longest length among the cables 103, and thus it is possible to use a short cable 103 (i.e., a potentially more inexpensive cable due to less amount of material). Furthermore, space for placing an extended portion of the cables 100, which is necessary in the comparative power generation system where the lengths are normalized to the longest length among the cables 100, is no longer necessary in the power generation system 1, allowing the system to be made smaller in the power generation system 1. Furthermore, in the power generation system 1, it is possible to design the system without worrying about the lengths of the cables 103, and thus the degree of freedom of design increases, allowing sales opportunities for the power generation system 1 to be increased due to advantages such as short delivery time.

In addition, the internal combustion engine 10 according to an embodiment of the present invention includes the bandpass filter 150. By setting the frequency band of the signal that needs to pass through the bandpass filter 150 to the frequency band of an output signal of the knock sensor 1012, the internal combustion engine 10 can remove signals in the frequency bands outside the output signals of the knock sensor 1012, which serve as noise for the output signal of the knock sensor 1012.

Thus, the internal combustion engine 10 according to an embodiment of the present invention can more correctly detect the vibration to be detected by the knock sensors 1012, that is, the output signals of the knock sensors 1012, compared to a case where the bandpass filter 150 is not included.

Note that a storage unit, other storage device, and the like in each embodiment of the present invention may be provided anywhere as long as information is transmitted and received appropriately. In addition, storage units, other storage devices, and the like may exist and store data in a distributed manner as long as information is transmitted and received appropriately.

Note that for the processing in the embodiments of the present invention, the order of processing may be changed as long as processing is performed appropriately. For example, for the processing flow illustrated in FIG. 3, steps S2 and S3 and steps S4 and S5 have been described in this order for convenience of explanation. However, there is a possibility that processing of step S4 is performed earlier than that of step S2.

Although the embodiments of the present invention have been described, the above-described control circuit 1022 and other control devices may include a computer system therein. The processes described above are stored in a computer-readable recording medium in the form of a program, and the processes are performed by a computer reading and executing the program. A specific example of the computer is illustrated below.

Figure 5:
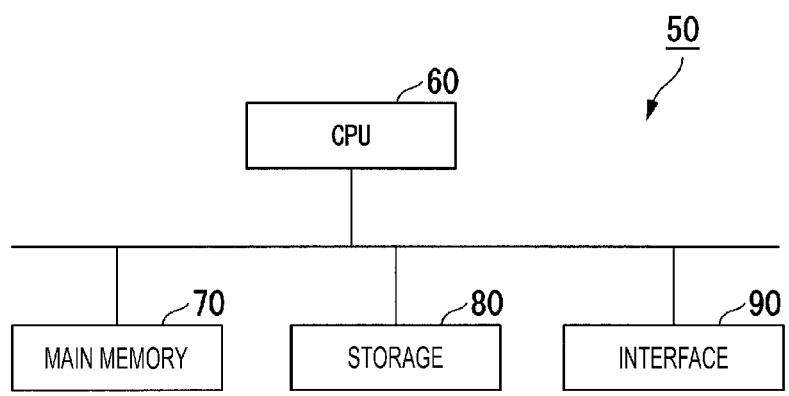
FIG. 5 is a schematic block diagram illustrating the configuration of a computer according to at least one of the embodiments.

FIG. 5 is a schematic block diagram for illustrating the configuration of a computer in at least one of the embodiments.

As illustrated in FIG. 5, a computer 50 includes a CPU 60, a main memory 70, a storage 80, and an interface 90.

For example, the above-described control circuit 1022 and other control devices are each implemented in the computer 50. Also, the operation of each processing unit described above is stored in the storage 80 in the form of a program. The CPU 60 reads a program from the storage 80, stores the program in the main memory 70, and executes the above-described processing in accordance with the program. In addition, the CPU 60 secures a storage area corresponding to each storage unit described above in the main memory 70 according to the program.

Examples of the storage 80 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 80 may be an internal medium directly connected to the bus of the computer 50 or an external medium connected to the computer 50 via the interface 90 or a communication line. Also, in a case where this program is delivered to the computer 50 via a communication line, the computer 50 that receives the delivery may store the program in the main memory 70 and execute the above-described processing. In at least one of the embodiments, the storage 80 is a non-temporary tangible storage medium.

The program may realize some of the above-described functions. Further, the program may be a so-called differential file (differential program), which can realize the above-mentioned functions in combination with a program already recorded in the computer system.

While certain embodiments of the present invention have been described, these embodiments have been presented by way of example only, and are not intended to limit the scope of the invention. Various additions, various omissions, various substitutions, and various modifications may be made to these embodiments without departing from the scope of the invention.

INDUSTRIAL APPLICABILITY

According to an internal combustion engine and a power generation system according to the embodiments of the present invention, it is possible to correctly detect the vibration to be detected by the knock sensor.

REFERENCE SIGNS LIST

1 Power generation system
10 Internal combustion engine
20 Generator
50 Computer
60 CPU
70 Main memory
80 Storage
90 Interface
100, 103, 103a1, 103a2, 103an Cable
101 Internal combustion engine main body
102 Control board
110 First charge amplifier
120 Second charge amplifier
130 Differential amplifier
140 Gain amplifier
150 Bandpass filter
1101, 1201, 1301, 1401 Operational amplifier
1102, 1103, 1202, 1203, 1302, 1303, 1304, 1305, 1402, 1403, 1404 Resistor
1104, 1204 Capacitor
1011a1, 1011a2, 1011an Cylinder
1012a1, 1012a2, 1012an Knock sensor
1021, 1021a1, 1021a2, 1021an Amplification circuit
1022 Control circuit

The invention claimed is:

1. An internal combustion engine, comprising:
an internal combustion engine main body including a plurality of cylinders;
a plurality of knock sensors being provided on each of the plurality of cylinders;
a control board including same number of amplification circuits as the plurality of cylinders; and
a plurality of cables differing in length and each connecting each of the knock sensors and the control board, each of the plurality of cables having different capacitance;
wherein each of the amplification circuits includes a first charge amplifier, a second charge amplifier, a differential amplifier, a gain amplifier, and a bandpass filter,
wherein the first charge amplifier includes a first operational amplifier, a first resistor, a second resistor, and a first capacitor;
the second charge amplifier includes a second operational amplifier, a third resistor, a fourth resistor, and a second capacitor;
the differential amplifier includes a third operational amplifier, a fifth resistor, a sixth resistor, a seventh resistor, and a eighth resistor; and
the gain amplifier includes a fourth operational amplifier, a ninth resistor, a tenth resistor, and an eleventh resistor;
wherein a first terminal of the first resistor is connected to a non-inverting input terminal of the first operational amplifier;
a first terminal of the second resistor and a first terminal of the first capacitor are connected to an inverting input terminal of the first operational amplifier;
a second terminal of the second resistor and a second terminal of the first capacitor are connected to an output terminal of the first operational amplifier;
a ground is connected to a second terminal of the first resistor;
a first terminal of the third resistor is connected to a non-inverting input terminal of the second operational amplifier;
a first terminal of the fourth resistor and a first terminal of the second capacitor are connected to an inverting input terminal of the second operational amplifier;
a second terminal of the fourth resistor and a second terminal of the second capacitor are connected to an output terminal of the second operational amplifier;
the ground is connected to a second terminal of the third resistor;
a first terminal of the fifth resistor and a first terminal of the sixth resistor are connected to a non-inverting input terminal of the third operational amplifier; a first terminal of the seventh resistor and a first terminal of the eighth resistor are connected to the an inverting input terminal of the third operational amplifier;
a second terminal of the eighth resistor is connected to an output terminal of the third operational amplifier;

an output terminal of the first charge amplifier is connected to a second terminal of the fifth resistor;

the ground is connected to a second terminal of the sixth resistor;

an output terminal of the second charge amplifier is connected to a second terminal of the seventh terminal;

a first terminal of the ninth resistor is connected to a non-inverting input terminal of the fourth operational amplifier;

a first terminal of the tenth resistor and a first terminal of the eleventh resistor are connected to an inverting input terminal of the fourth operational amplifier;

a second terminal of the tenth resistor is connected to an output terminal of the fourth operational amplifier;

the ground is connected to a second terminal of the ninth resistor;

an output terminal of the differential amplifier is connected to a second terminal of the eleventh resistor;

an output terminal of the gain amplifier is connected to a first terminal of the bandpass filter;

the bandpass filter is configured to output, from a second terminal of the bandpass filter, only a signal of a predetermined frequency component in a signal output by the differential amplifier, as an output signal of each of the amplification circuits;

an input terminal of the first charge amplifier is connected to a corresponding cable of the plurality of cables and an input terminal of the second charge amplifier is connected to another corresponding cable of the plurality of cables, the number of the plurality of cables being the twice number of the plurality of cylinders; and each of the plurality of knock sensors is connected to one of the plurality of cables, the one of the plurality of cables being connected to a corresponding amplification circuit of the amplification circuits, the number of the amplification circuits being the same as the number of the plurality of cylinders.

2. The internal combustion engine according to claim 1, wherein
the control board includes a determination unit configured to determine whether knocking has occurred on the basis of an output signal of the amplification circuit.

3. The internal combustion engine according to claim 2, wherein
the determination unit is configured to determine, if it is determined that an amplitude of the output signal of the amplification circuit is not greater than a threshold value of amplitude for determining that knocking has occurred, that no knocking has occurred; and
the determination unit is configured to determine, if it is determined that the amplitude of the output signal of the amplification circuit exceeds the threshold value, that knocking is occurring.

4. The internal combustion engine according to claim 1, wherein
the control board includes a correction unit configured to correct, if it is determined that knocking is occurring, an ignition timing of fuel in the internal combustion engine main body or an amount of fuel supplied to the internal combustion engine main body.

5. A power generation system, comprising:
the internal combustion engine according to claim 1; and
a generator configured to generate power, with energy generated by the internal combustion engine serving as a power source.

* * * * *